No. 890,263. PATENTED JUNE 9, 1908.
F. B. CONVERSE, Jr.
LINOTYPE MACHINE.
APPLICATION FILED NOV. 5, 1903. RENEWED MAR. 12, 1907.

4 SHEETS—SHEET 2.

Witnesses.
E. B. Gilchrist
B. W. Brockett

Inventor.
Francis B. Converse Jr.
By his Attorneys,
Thurston & Bates

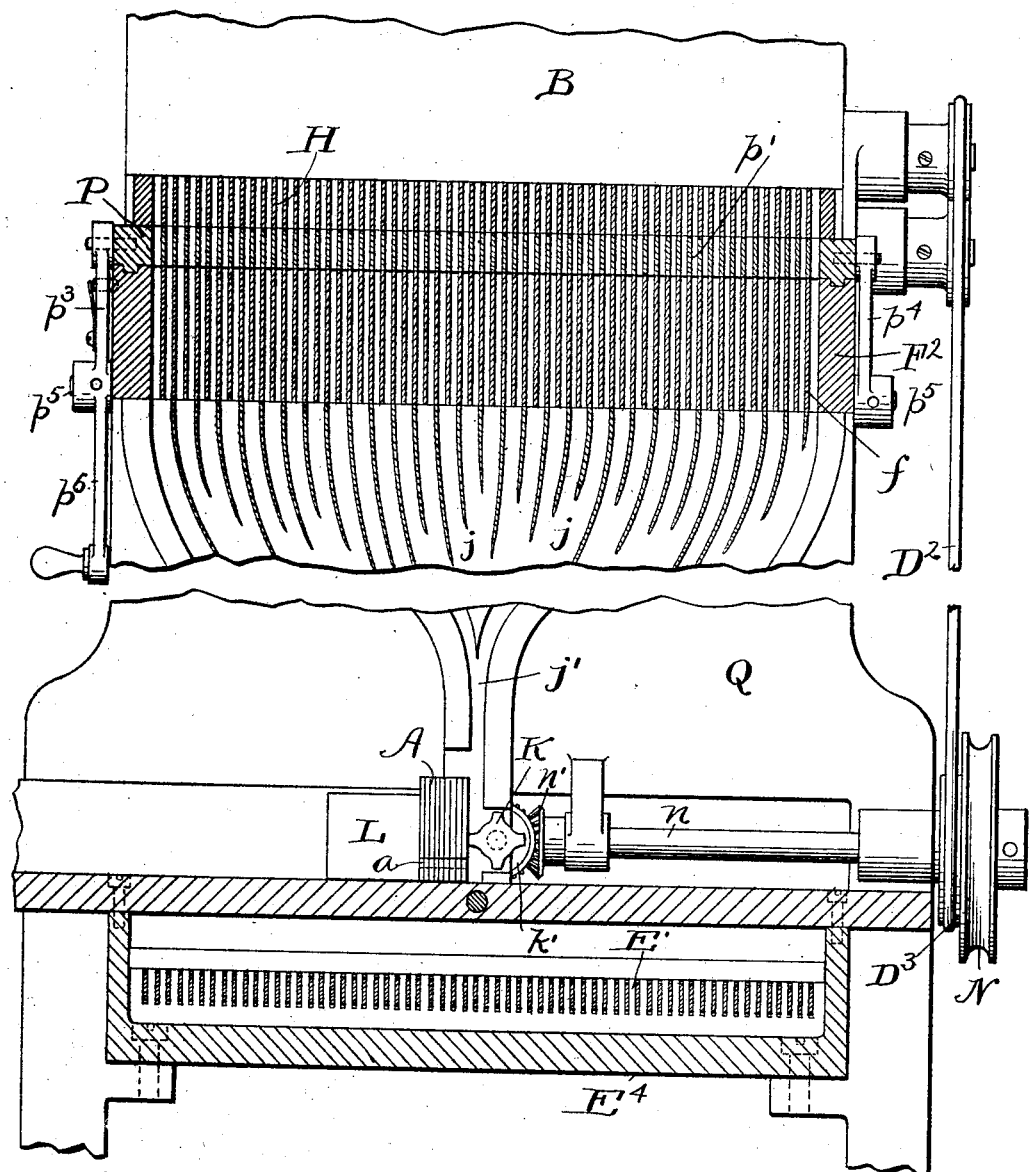

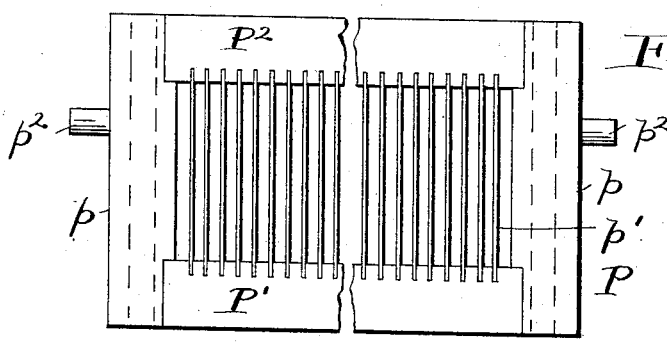
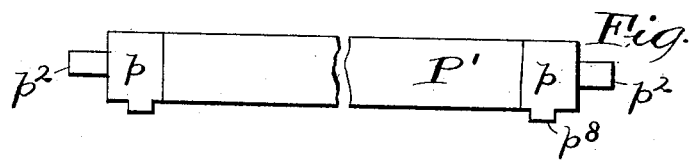
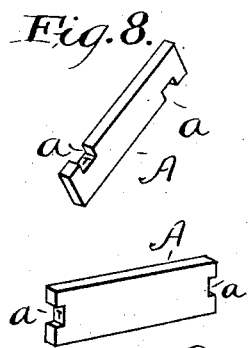
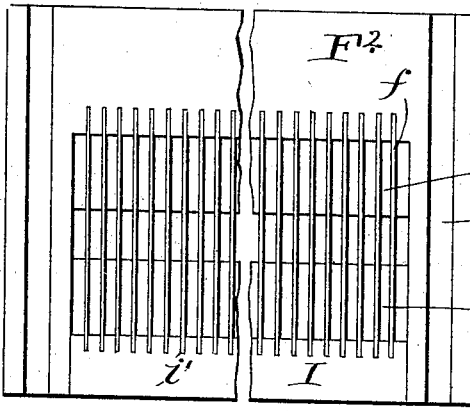
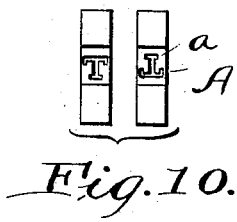
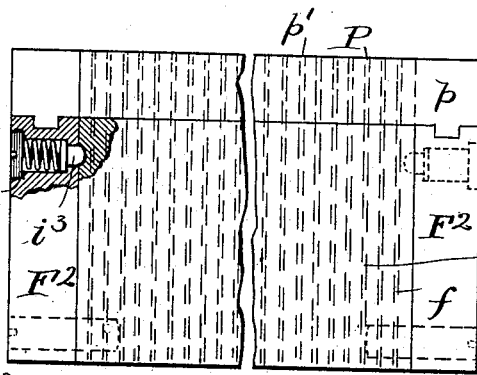

UNITED STATES PATENT OFFICE.

FRANCIS B. CONVERSE, JR., OF CLEVELAND, OHIO, ASSIGNOR, BY MESNE ASSIGNMENTS, TO MERGENTHALER LINOTYPE COMPANY, A CORPORATION OF NEW YORK.

LINOTYPE-MACHINE.

No. 890,263.   Specification of Letters Patent.   Patented June 9, 1908.

Application filed November 5, 1903, Serial No. 179,981. Renewed March 12, 1907. Serial No. 361,976.

*To all whom it may concern:*

Be it known that I, FRANCIS B. CONVERSE, Jr., a citizen of the United States, residing at Cleveland, in the county of Cuyahoga and State of Ohio, have invented a certain new and useful Improvement in Linotype-Machines, of which the following is a full, clear, and exact description, reference being had to the accompanying drawings.

The object of this invention is to provide means whereby matrices bearing characters in different faces, may be assembled in line in such manner as to present a selected character in operative position at the will of the operator. I accomplish this by providing casting characters in opposite sides of the matrices, and a suitable mechanism to relatively invert the matrices as they are being assembled so that either casting character may be set by the same key. The characters in the same matrix may represent different fonts of the same letter, as, for example, Roman and italic, or they may be for casting different characters as desired. The two characters in the matrices correspond with the two characters which the key represents, and a suitable shift determines which of the two characters becomes active.

The invention includes broadly the combination of matrices having characters in different faces, with assembling mechanism adapted to turn the matrices, and controllable means adapted to effect the turning of the matrices, so that they will each present one character or another in the line at the will of the operator.

Figure 1:
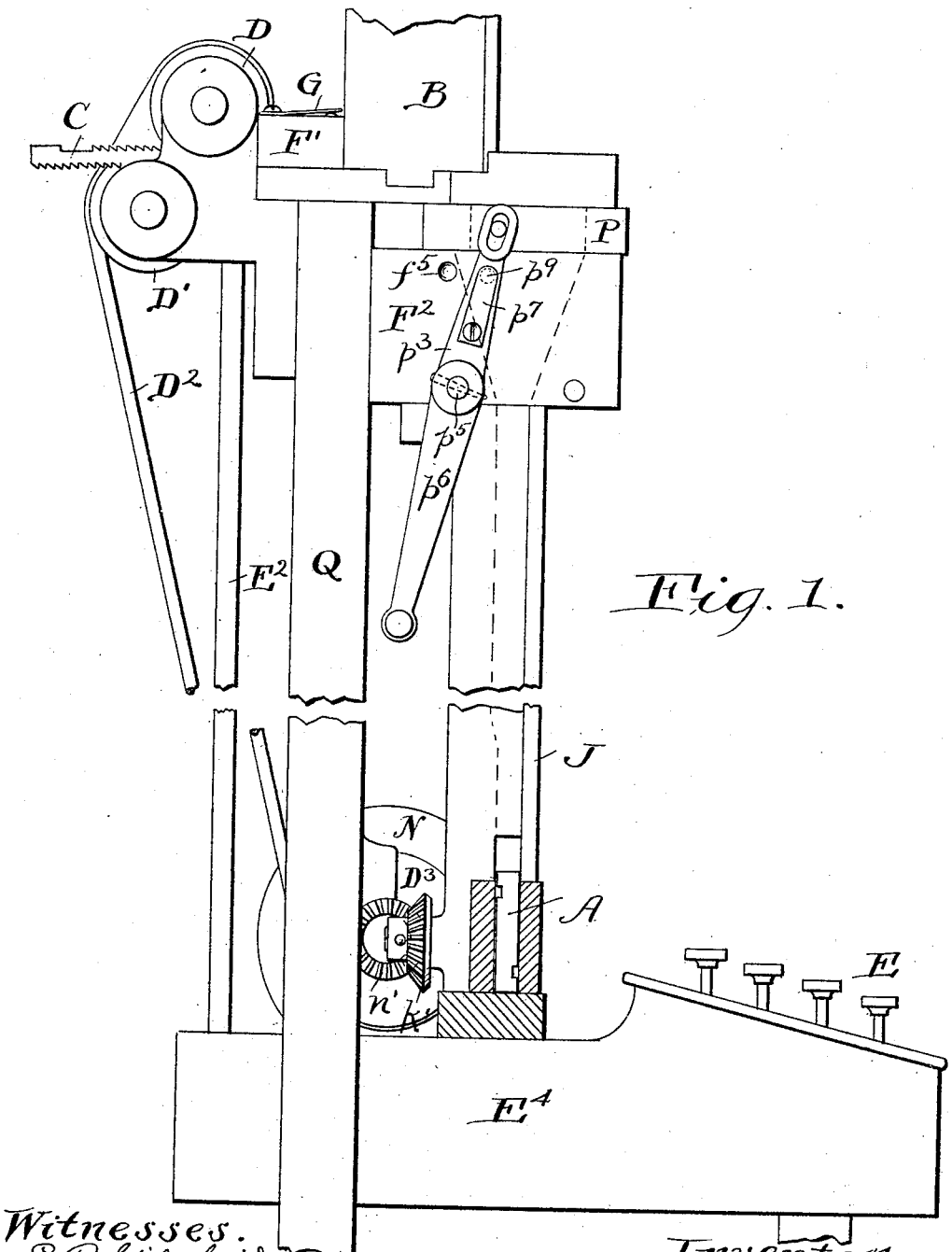
Figure 2:
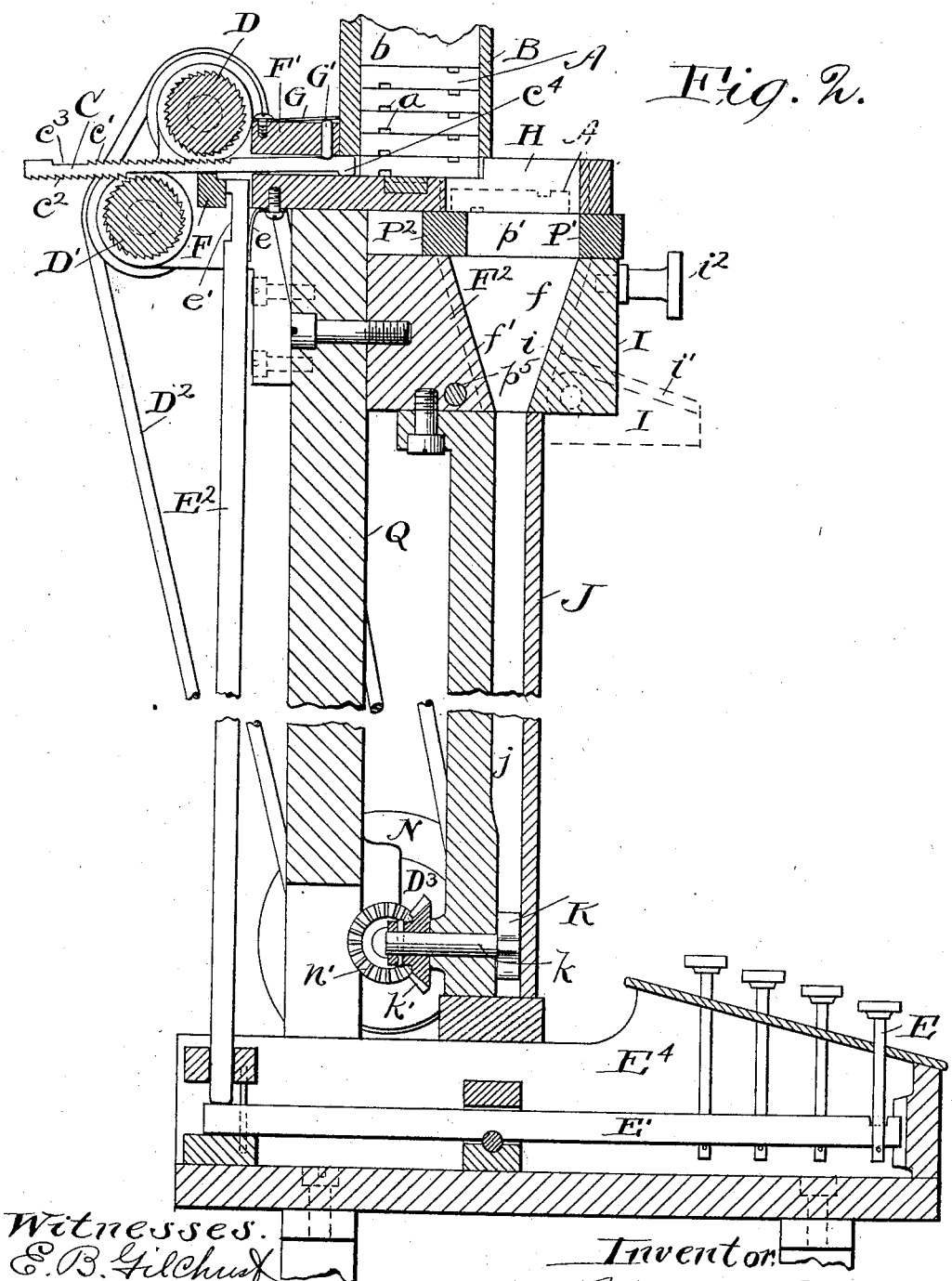

In the drawings, Figure 1 is a side elevation of the assembling mechanism. Fig. 2 is a vertical section through the same. Fig. 3 is a vertical section at right angles to Figs. 1 and 2. In each of these figures a portion of the race plate and standards has been broken out; the upper portion of the magazine has also been broken away. Fig. 4 is a plan of the shifting frame for inverting the matrices. Fig. 5 is a front edge view thereof. Fig. 6 is a plan of the parts just below the shifting frame. Fig. 7 is a front elevation of the swinging gate at the upper end of the race plate. Intermediate portions of each of these figures have been broken out, for condensation. Fig. 8 is a perspective view of one form of matrices adaptable for use with this mechanism. Fig. 9 is a perspective view of another form. Fig. 10 is a diagrammatic view representing at once the opposite ends of the matrix shown in Fig. 9, to illustrate the relative inversion of the characters thereon.

The matrices themselves are designated A. They have casting characters or matrices proper $a$ formed in opposite faces, either in the side edges as shown in Figs. 3 and 8, or in the end edges as shown in Figs. 9 and 10. In either case the characters are inverted one with reference to the other, so that whichever casting character is used will be the proper side up.

The matrices are contained in suitable channels $b$ in a vertical magazine B. The lowest matrix in the channel is adapted to be ejected therefrom by being shoved forward beneath the front plate of the magazine by an ejector C. This ejector, as shown, has teeth $c$ on its upper edge and teeth $c^2$ on its lower edge. Above and below the ejectors are toothed rollers D and D' continuously rotated by a belt $D^2$. The lower edge of the upper roller rotates toward the magazine and the upper edge of the lower roller away from it, from which it results that if the ejector bar is raised into engagement with the roller D it is moved forward shoving the lowest matrix out of its channel in the magazine. If then the ejector descends into engagement with the roller D' it is thereby retracted.

The operation of the ejector above described is caused by the depression of a suitable key as E in the keyboard. Each of the keys of the keyboard is connected with a key lever E' and on the rear end of this key lever stands a bar $E^2$ which when the key is depressed is thereby raised to raise the ejector into engagement with the roller D. When the bar $E^2$ is thus raised a spring $e$ moves the bar rearward causing its notch $e'$ to hook over a stationary guide F. As the ejector reaches its forward movement, the front tooth on its lower side, impinging against the upper end of the bar $E^2$, shoves it forward, releasing it from the bar F and allowing it to drop by its own weight; at the same time the notch $c^3$ at the rear of the teeth $c'$ comes beneath the roller D freeing it from the teeth thereof, and thereupon the ejector drops, assisted by the spring C which is secured to a stationary member F' and bears down upon the ejector through the pin G'. Such movement of the ejector causes its teeth $c^2$ to engage the roller D' and this drives the ejector back nearly to initial position. Just as the teeth $c^2$ clear the teeth of the roller D', an inclined notch in the upper edge of the ejector comes beneath the pin G', and the spring G acting therethrough gives the ejector a still additional rearward movement to insure the teeth $c^2$ being preferably free from the toothed roller D'.

In the position of rest of the ejector the spring G acting upon the ejector very near its fulcrum $c^4$ presents very little resistance to the raising of the ejector. At the ejector's extreme forward position, however, when the raising bar $E^2$ becomes released, this spring $G^4$ acts downward on the ejector with a leverage sufficient to insure the bar $E^2$ being depressed, overcoming the frictional hold of the spring $e$.

As the matrices are ejected forward from the lower end of the magazine they pass between vertical plates H and from thence drop downward passing into the race plate J which has converging channels $j$ whereby the matrices come down by gravity to a central common channel $j'$. There they are fed forward by a wiper wheel K against the previously set matrices, or against some yieldingly resisting member as the block L. This wiper wheel K is shown as being on the forward end of a shaft $k$ whose rear end carries a bevel gear $k'$. This gear meshes with another bevel gear $n'$ on a shaft $n$ whose other end carries the main driving pulley N. The belt $D^2$ referred to runs from a pulley $D^3$ on this shaft. Thus the pulley N drives both the wiper wheel and the two cylinders D and D'.

The matrices in passing from their ejected positions just beneath the front of the magazine into the race plate are turned from a horizontal to a vertical position. This is accomplished by allowing the matrix in such ejected position to rest at one end on a ledge while the other end is free. Wherefore the matrix swings down about the ledge as a fulcrum into the vertical position. If the ledge is near the rear end of the matrix, as the latter swings downward it brings its upper side toward the front of the machine; if, on the other hand, the ledge is near the front end of the matrix and its rear end swings downwardly, then the edge which was beneath in the magazine comes toward the front of the machine. Thus by changing the position of the ledge, the matrix is caused to present either of its opposite faces desired.

The ledges referred to are the two bars P' and $P^2$ which are connected together at their ends by the bars $p$ $p$ whereby there is thus made a horizontal frame, designated P. Suitable cross partitions $p'$ divide this frame into channels corresponding to those of the end space magazine. Projecting from the end pieces $p$ are pins $p^2$, and yoking around these pins are rocker arms $p^3$, $p^4$ on a shaft $p^5$. A suitable lever $p^6$ (which may be a continuation of the arm $p^3$) furnishes convenient means for rocking this shaft and thus shifting the frame forward or backward the lever being held in either extreme position by the spring $p^7$ pressing a detent $p^9$ into a dent, as $f^5$.

Fig. 2 shows the frame P in its forward position, so that the ejected matrices have their rear portions drop onto the bar $P^2$ and turning about this bar the matrices descend with their upper edges forward. If, however, the lever $p^6$ is drawn forward shifting the frame toward the rear, the ledge $P^2$ comes into position clear of the matrices while the ledge P' stands beneath the forward ends thereof, and thus in this case the under face of the matrix is swung to the front.

The shifting frame P, has, on the under side of the end pieces $p$, ribs $p^8$ which occupy grooves in the stationary frame portion $F^2$ so that the shifting frame may be accurately guided. This frame portion $F^2$ has partitions $f$ corresponding with those of the shifting frame and the magazine. The opening in this frame portion contracts downward in the hopper-like form shown to bring matrices into the vertical position. The rear wall $f'$ of this hopper portion is the surface of the frame member $F^2$, while the front wall $i$ is the rear face of a horizontally pivoted gate I.

The gate I normally stands in the position shown in full lines in Fig. 2 completing the hoppers. Its rear face has grooves $i'$ which receive the forward edges of the partitions $f$. When desired to clean or inspect the interior, however, the gate I may be turned downward into the horizontal position shown in the dotted lines in Fig. 2. A suitable knob $i^2$ may be secured to the gate for conveniently opening it, and the gate may be held in active position by the detents $i^3$ occupying recesses in the ends of the frame member $F^2$ and pressed toward the gate by suitable springs $i^4$.

The ejecting mechanism and the parts at the upper end of the race plate are shown as carried by a suitable vertical frame plate Q. The keyboard box $E^4$ is likewise secured to this frame plate and the lower end of the race plate is secured to the keyboard box.

I believe it to be wholly new in the art to combine with the magazine and matrices stored therein and having characters in different faces, means for releasing or discharging the matrices from the magazine, and means whereby the released matrices may be inverted at will or permitted to proceed without inversion, so that one character or the other will be presented in line, as the operator may determine, and it will be evident to the skilled mechanic that the matrices, the magazine, the releasing devices, and the devices for controlling the position of the matrix in the line, may be widely modified without departing from the limits of my invention.

Having described my invention, I claim:

1. In a linotype machine, the combination, with matrices having casting characters in opposite faces, of means for assembling them either end up as desired in a line.

2. In a linotype machine, the combination of matrices having casting characters in different faces, and a variable fulcrum around which the matrices turn to present either character.

3. In a linotype machine, the combination of matrices having casting characters in different faces, finger keys, for causing the assemblage thereof, and a hand-operated shift for causing the matrices to turn and thus present either character at will.

4. In a linotype machine, the combination of matrices having casting characters in opposite faces, and means for giving the matrices a quarter turn in either direction to present either face in an assembled line of matrices.

5. In a linotype machine, the combination of matrices having casting characters in different faces, means for assembling the same in a line, and means for turning them as they are being assembled to present either character.

6. In a linotype machine, the combination of matrices having casting characters in different faces, finger keys, mechanism operated thereby to cause the assemblage of said matrices, and adjustable mechanism operating to cause gravity to turn said matrices as they are being assembled.

7. The combination of matrices having in different faces different forms of the same character, keys, and mechanism operated thereby to cause the assemblage of the matrices by gravity, and a shift to tilt the matrix differently to cause gravity to assemble it with either character in the line.

8. The combination of means for containing a supply of matrices, means for ejecting them from the supply, means for assembling them into a line, and means for turning them in either direction in transit.

9. The combination, with matrices having casting characters in opposite faces, of a magazine for containing the matrices, mechanism for ejecting the matrices, and adjustable means for engaging different portions of the matrix to turn it.

10. The combination of matrices having casting characters in different faces, keys corresponding to the different matrices, mechanism operated by the keys for ejecting the matrices from their supply, automatic means including a race-way down which the matrices pass by gravity for assembling the ejected matrices into a line, and means under the control of the operator for varying the position of the matrix as it passes from the magazine to the assemblage point, whereby it is assembled with either face in line as desired.

11. The combination, with matrices having casting characters in opposite faces, a race plate, and means for ejecting the matrices and causing them to pass into the race plate either end foremost as desired.

12. In a linotype machine, the combination of matrices having casting characters in opposite faces, a magazine for holding the matrices in horizontal position, a vertical race plate, finger keys and mechanism operated thereby for ejecting the matrices from the magazine into the race plate, and mechanism for turning the matrix in either direction 90 degrees as it passes into the race plate.

13. In a linotype machine, the combination of a vertical magazine adapted to contain matrices, a race plate leading downward from near the lower edge of the magazine, means for ejecting matrices into position where they may pass into the magazine, a ledge around which the matrix may turn in so passing, and means for shifting said ledge.

14. In a linotype machine, the combination of a magazine for matrices, a race plate, means for ejecting the matrices from the lower end of the magazine over the upper end of the race plate, means for establishing a ledge as desired beneath either the front end of the ejected matrix or the rear end, the other end being free, whereby the matrix swings into the race plate with either edge forward.

15. The combination of a race plate, a shiftable frame near the upper end thereof, a lever arranged to shift said frame, a magazine near the upper end of the race plate, a system of ejectors, a key-board, connections between the keys thereof and the ejectors whereby the keys may eject matrices from the magazine onto the frame, said frame being so positioned that the matrix rests thereon only at one end whereby the matrix swings downward around such support and passes into the race plate either end foremost as desired.

16. In a linotype machine, the combination of a magazine adapted to carry matrices, a race plate, mechanism for ejecting the matrices into position where they may pass into the race plate, a shiftable slotted frame in the path of the ejected matrix and means for shifting said frame to cause it to present a turning ledge beneath either the rear end or the front end of said matrix as desired.

17. In a linotype machine, the combination of a vertical magazine adapted to contain matrices lying lengthwise horizontally one above the other, a race plate extending downwardly from near the lower edge of the magazine, key actuated mechanism for ejecting the lowermost matrix in the magazine into position over the race plate, a ledge lower down than the matrix in its ejected position, and mechanism for shifting said ledge to cause it to stand beneath the front end of the matrix or the rear end, as desired, the unsupported end of the matrix thus turning about the supporting ledge and descending into the race plate either end foremost.

18. The combination with matrices having characters in opposite edges, of means for assembling them with either edge facing in the active direction as desired.

19. The combination with matrices having characters in the opposite edges, means for assembling the matrices, and means for controlling the assemblage to cause either edge as desired to face in the active direction.

20. The combination with matrices having characters in opposite edges, which characters are inverted with reference to each other, means for assembling the matrices, and means for turning them as they are being assembled to present either character.

21. The combination with matrices having characters inverted, one with reference to the other, and controllable means for assembling such matrices and causing them to present one character or the other at will.

22. The combination with matrices having characters which are inverted with reference to each other, means for assembling the matrices, and means for turning them as they are being assembled to present either character.

23. The combination with a magazine for assorted matrices, a holder for composed matrices, said matrices having characters which are inverted with reference to each other, and means for turning a matrix about an axis subsequent to its ejection from the magazine and prior to its assembling in the holder.

24. The combination with matrices each having a plurality of characters and controllable means for turning the matrices to present either character.

25. The combination with matrices having a plurality of characters which are variant forms of the same character, one of such characters being inverted with reference to the other, and controllable mechanism for turning the matrices to present such inverted character in the normal uninverted position.

26. A matrix having characters which are inverted with reference to each other, and means for turning such matrix.

27. The combination of a series of matrices each having in opposite sides two characters inverted with reference to each other, and an assembling mechanism including controllable means for turning one matrix end for end in relation to the next; whereby each matrix may be caused to present either of its characters in the line without regard to the characters presented by the adjacent matrix.

28. The combination of matrices having in their opposite edges variant forms of the same character, and an assembling mechanism controllable at will to cause the presentation of one character or the other in the line, as demanded; whereby the line may be composed of characters of either or both forms.

29. A series of matrices each having characters in different faces, in combination with a magazine adapted to contain said matrices in definite positions, means for releasing the matrices singly from the magazine, means for assembling the released matrices in line, and means controllable by the operator for turning the individual matrices or not, as desired; whereby each matrix may be caused to present one or the other of its characters in operative position at the will of the operator.

30. The combination with a magazine adapted to contain matrices, one above the other, each matrix having a plurality of characters inverted with reference to each other, mechanism for releasing the matrices, and mechanism for turning matrices as desired to enable either character to stand right side up in the line.

31. The combination of a magazine and matrices each having characters in different faces, means for releasing the matrices individually from the magazine, means for guiding the released matrices without rotation, and means movable at will into the path of the released matrices to cause a definite rotation; whereby each matrix may be caused to present the selected character in operative position.

In testimony whereof, I hereunto affix my signature in the presence of two witnesses.

FRANCIS B. CONVERSE, Jr.

Witnesses:
    ALBERT H. BATES,
    B. W. BROCKETT.